US006201959B1

(12) United States Patent
Kawashima

(10) Patent No.: US 6,201,959 B1
(45) **Date of Patent: *Mar. 13, 2001**

(54) RADIO SELECTIVE CALL RECEIVER AND METHOD FOR STORING RECEIVED MESSAGE

(75) Inventor: Shinichi Kawashima, Shizuoka (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/915,041

(22) Filed: Aug. 20, 1997

(30) Foreign Application Priority Data

Aug. 23, 1996 (JP) .................................................. 8-222891

(51) Int. Cl.[7] ............................ H04M 11/10; H04B 7/00; H04Q 3/02; H04Q 9/14

(52) U.S. Cl. .................... 455/412; 455/38.1; 340/825.44

(58) Field of Search .................................. 455/412, 31.1, 455/32.1, 38.1, 38.2, 38.4; 340/825.44, 311.1; 711/1, 100

(56) References Cited

U.S. PATENT DOCUMENTS 4,626,842 * 12/1986 Ichikawa et al. ................... 455/38.4
4,769,641 * 9/1988 Yoshizawa et al. ............ 340/825.44
4,812,813 * 3/1989 Ide et al. ......................... 340/825.44
4,873,520 * 10/1989 Fisch .............................. 340/825.44
5,859,594 * 1/1999 King ............................... 340/825.44
6,021,321 * 2/2000 Kawashima ......................... 455/38.1

FOREIGN PATENT DOCUMENTS 60-74736 4/1985 (JP) .
2-243027 9/1990 (JP) .

* cited by examiner

*Primary Examiner*—Nguyen Vo
(74) *Attorney, Agent, or Firm*—Ostrolenk, Faber, Gerb & Soffen, LLP

(57) ABSTRACT

A radio selective call receiver can improve use efficiency of memory by permitting arbitrary selection of sector length of a memory area depending upon a message length of a message transmitted. The receiver is provided with a radio signal receiving portion for receiving a radio signal, and a controller for comparing a selective call signal in the received radio signal with a call number assigned to the receiver and to take the received message corresponding to the received call signal when a matching is established. A storage portion stores the message received by the controller. Through the controller, a sector length is determined depending upon the message length of the received message. Then the received message is stored in the storage portion depending upon the determined sector length.

17 Claims, 7 Drawing Sheets

RADIO SELECTIVE CALL RECEIVER AND METHOD FOR STORING RECEIVED MESSAGE

BACKGROUND OF THE INVENTION

1. Field of the Invention

The present invention relates generally to a radio selective call receiver. More specifically, the invention relates to a radio selective call receiver which can receive a free word message and figure message including reception information and a method for storing the received message.

2. Description of the Related Art

A message management system of the modern radio selective call receiver employs a sector system which has high storage efficiency (Japanese Unexamined Patent Publication (Kokai) No. Showa 60-74736 and Japanese Unexamined Patent Publication No. Heisei 2-243027). Particularly, the radio selective call receiver which can receive a free word message including reception information employs the sector system in a message memory in order to enhance storage efficiency of the message as the received message. Such a radio selective call receiver which can receive the free word message, receives Chinese character (Kanji Character) messages, and can also receive short figure message.

However, in such a conventional ratio selective call receiver, the size of the sector of the message memory is generally ½ to ⅛ of the maximum length of the received message. Therefore, when the figure message is received, one sector is occupied by a message of merely several characters which lowers use efficiency of the message memory. On the other hand, as a solution for this problem, sector size of the message memory can be made smaller. In such a case, when the long free word message is received, the number of sectors to be occupied by one message becomes large which make management of a message troublesome.

SUMMARY OF THE INVENTION

The present invention is worked out for solving the problems set forth above. Therefore, it is an object of the present invention to provide a radio selective call receiver which can arbitrarily select a sector length of a memory area depending upon a message length to be stored and thus can enhance use efficiency of the memory.

According to the first aspect of the present invention, a radio selective call receiver comprises:

- a radio signal receiving portion for receiving a radio signal;
- a storage portion for storing a received message; and
- a controller performing control for storing the received message corresponding to a selective call signal in the radio signal received by the radio signal receiving portion, in the storage portion, the controller including sector length determining means for determining a sector length depending upon a message length of the received message; and
  - storage control means for storing the received message in the storage portion depending upon the determined sector length.

According to the second aspect of the present invention, a method for storing a received message in a radio selective call receiver comprises:

- step of receiving a radio signal;
- step of determining a sector length detecting upon a message length of a received message contained in the received radio signal; and
- step of storing the received message in a storage portion according to the determined sector length.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. Well-known structures are not shown in detail in order to avoid unnecessary obscuring the present invention.

Figure 1:
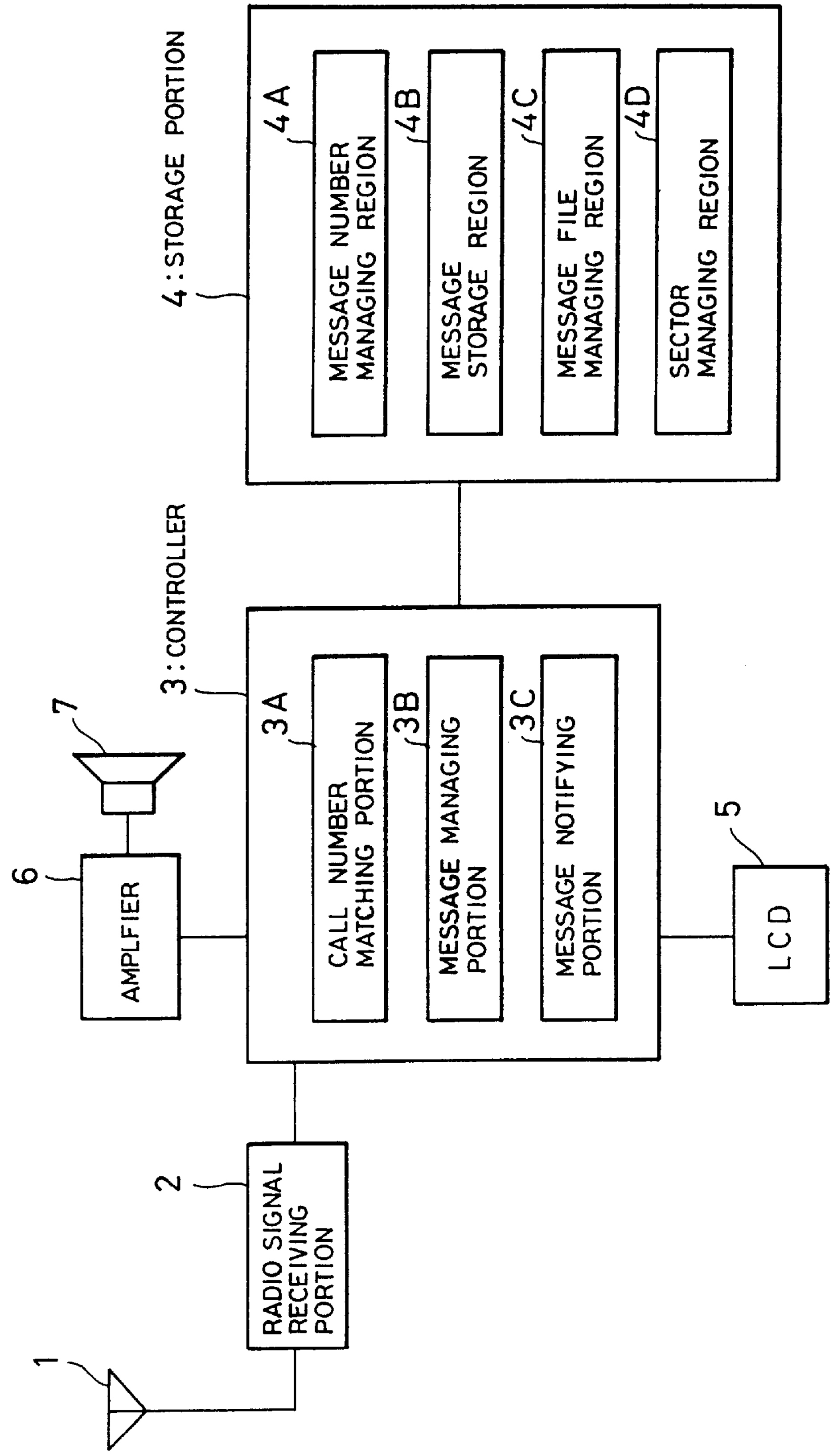
FIG. 1 is a block diagram showing the preferred embodiment of a radio selective call receiver according to the present invention.

FIG. 1 is a block diagram of the preferred embodiment of a radio selective call receiver according to the present invention. In FIG. 1, the reference numeral 1 denotes an antenna for receiving a radio signal, 2 denotes a radio signal receiving portion amplifying and demodulating a radio signal, 4 denotes a storage portion for storing message information or so forth as reception message received, 7 denotes a speaker for generating an audible ring tone, 6 denotes an amplifier for amplifying a call signal, 5 denotes a liquid crystal display (hereinafter referred to as "LCD") as a display device for displaying a received message or so forth, 3 denotes a controller for controlling the storage portion 4, the liquid crystal display 5 and the amplifier 6. Controlles 3 has a call number matching means 3A, a message managing means 3B and a message notifying means 3C.

The call number matching means 3A compares a demodulated signal (selective call signal) demodulated by the radio signal receiving portion 2 and a call number assigned to the receiver. If the selective call signal matches with the call number, corresponding vector information and message information are received. The message managing means 3B stores the message information received by the call number matching means 3A in the storage portion 4. The message notifying means 3C is responsive to matching of the call number to display the received message information on the LCD 5 and to drive the speaker 7 through the amplifier 6 to generate an audible sound, in order to notify reception of the message.

The storage portion 4 employs a sector system which is achieves high message storage efficiency. The storage portion 4 is includes a message number managing region 4A, a message storage region 4B, a message file managing region 4C and a sector managing region 4D. Among these components, the message number managing region 4A stores in sequential order the received message in the time axis and the number of the message file managing region 4C where each of the corresponding messages is stored. The message storage region 4B is constructed with two kinds of sector regions, in which the sector size of one kind of sector region is greater than that of the other sector region. The status of each sector, i.e. vacant or occupied, is managed by the sector managing region 4D.

Message managing region 4C stores the sector numbers constituting each message per message file. The sector managing region 4D is comprised of a file status portion storing status of use of the message file managing region 4C and a message sector status portion storing status of use of the sector storing the message information.

Next, operation will be discussed. At first, a radio signal received through the antenna 1 is amplified and demodulated by the radio signal receiving portion 2. The demodulated selective call signal is compared with the call number assigned to the receiver in the call number matching means 3A of the controller 3. When the selective call signal matches with the call number, the vector information indicative of the kind of the received message and position of the message is received and parsed. Then, the corresponding message information is received.

Subsequently, the message information is stored in the storage portion 4. In conjunction therewith, in order to notify the reception of the message to the user carrying the receiver, a notice sound signal is fed from the controller 3 to the speaker 7 through the amplifier 6 for driving the latter. Simultaneously, the LCD 5 is driven to display the message as visual information.

Figure 2:
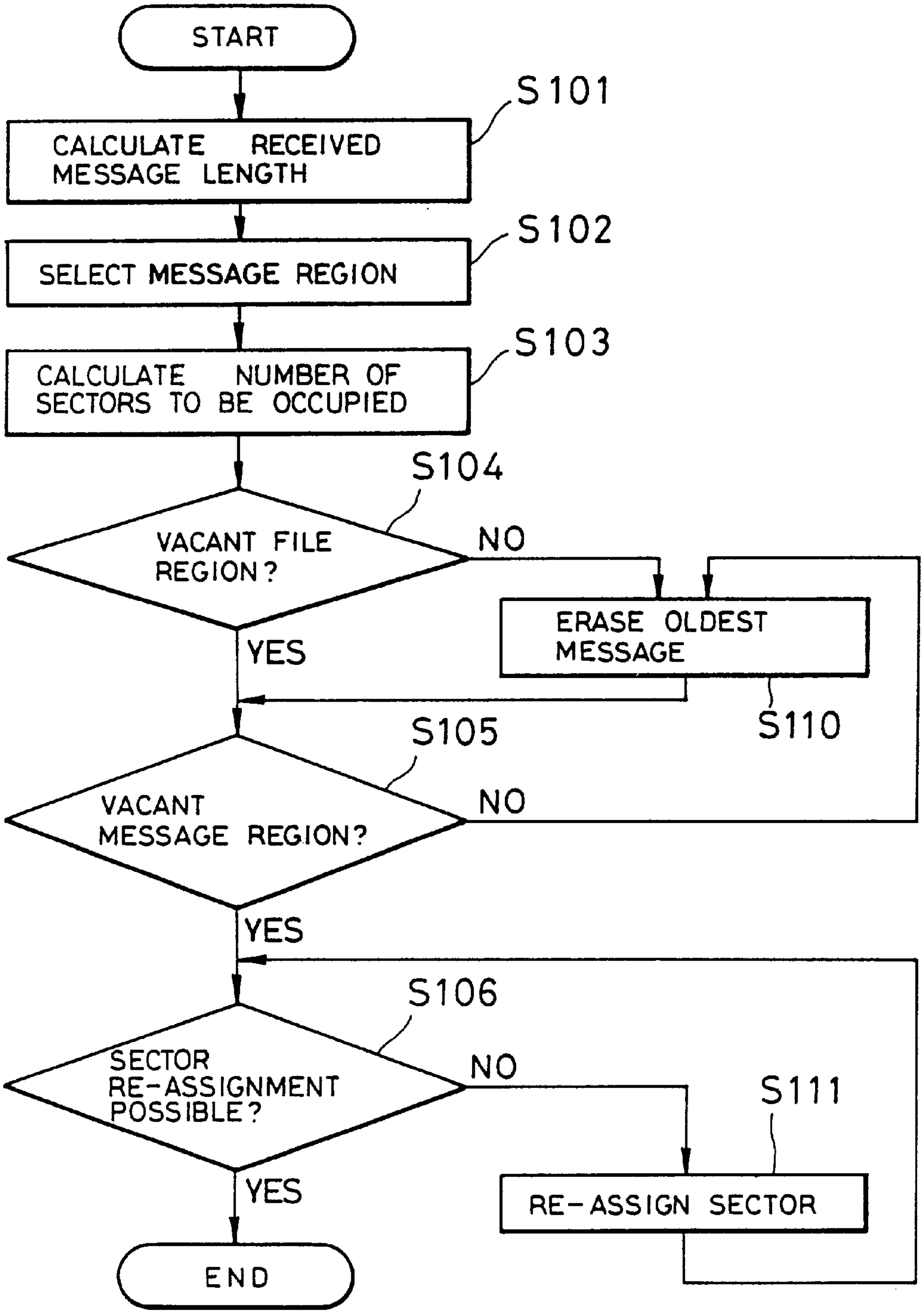
FIG. 2 is a flowchart showing operation of the preferred embodiment of the radio selective call receiver of FIG. 1.

Next, operation of the controller 3 for storing the message information in the storage portion 4 will be discussed in detail with reference to the flowchart in FIG. 2. As set forth above, the length of the message received by the controller 3 is calculated (step S101). On the basis of the calculated message length, one kind of a sector region in the message storage region 4B having higher message storage efficiency is selected (step S102). Next, depending upon the kind of selected sector region in the message storage region 4B, the number of sectors to be occupied by the message is calculated (step S103).

Thereafter file status of the sector managing region 4D retrieves vacant area in the message file managing region 4C to be used. If the sufficient vacant area for storing is present, the file region is obtained. On the other hand, if the sufficient vacant area is not present in the message file, namely, the number of stored message has reached the maximum number of the messages (step S104), the erasure of the message is performed from the oldest message to obtain the vacant area for storing the new message (step S110).

Even when the number of message does not reach the maximum number of the message as checked at step S104, if the sufficient vacant area cannot be obtained (step S105), the process is jumped to step S110 to perform the process as set forth above to erase the stored message from the oldest message to obtain the vacant area for storing the new message.

In the shown embodiment, in order to further enhance message storage efficiency, a check is performed whether re-assignment of sectors can be done or not (step S106). If re-assignment is possible, re-assignment of the sectors is performed. Namely, in the case of a message, for which the sector region having greater sector size is selected, if the message length to be stored in the final sector is shorter than the sector size of the other sector region which has a smaller sector size, the message to be stored in the final sector is re-assigned to the sector in the other smaller sector region (step S111).

Figure 3A:
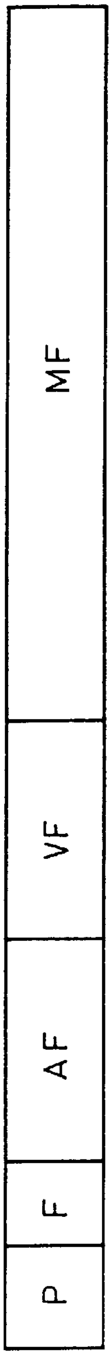
FIGS. 3A to 3D are explanatory illustrations showing format of reception signal of the radio selective call receiver according to the invention.

FIGS. 3A to 3D are charts showing signal format of the reception signal of the radio selective call receiver. In FIG. 3A, P is a preamble signal, F is a frame synchronization signal, AF is a selective call signal group, VF is a vector signal group and MF is a message signal group. The vector signal group VF corresponds to the selective call signal group in one-by-one basis to indicate the message signal position in vector manner, by a word number (designated by B6 to B0) of the start point of the relevant message and word number (designated by N6 to N0) contained in the message.

The kind of the relevant message signal is identified by the kind (designated by V2 to V0) of the message. In such case, for example, "001" identifies figure/Kana (Japanese character) message which is distinguished from free word message identified by "010" On the other hand, the message signal group MF contains message signals containing message words of the number as designated by the vector signal group VF.

Figure 3B:
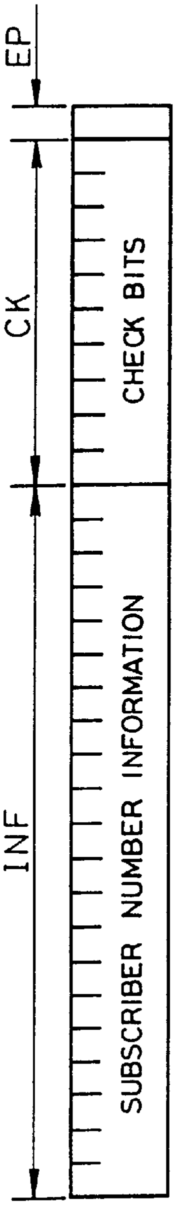
Figure 3C:
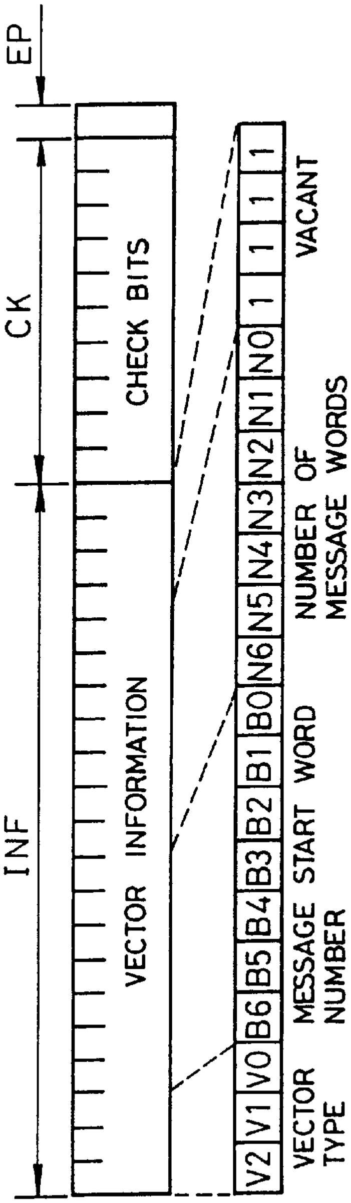
Figure 3D:
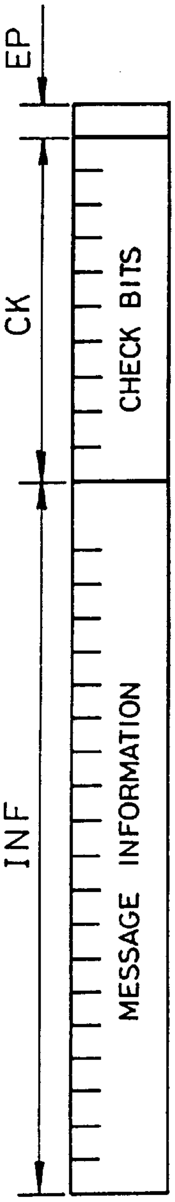

FIG. 3B shows one example of the selective call signal to be contained in the selective call signal group AF, which is a signal formed by adding a parity bit for a BHC code. FIG. 3C shows a vector signal in the vector signal group VF. In these signals, one word consists of 21 bits of information bit portion INF, 10 bits of check bit portion CK and 1 bit of even parity EP. Namely, each word consists of 32 bits. The message information is expressed by a binary coded decimal (BCD) code (4 bit structure) or shift JIS code (16 bit structure). Here, shift JIS code expresses Kanji character with 2 bites.

Figure 4:
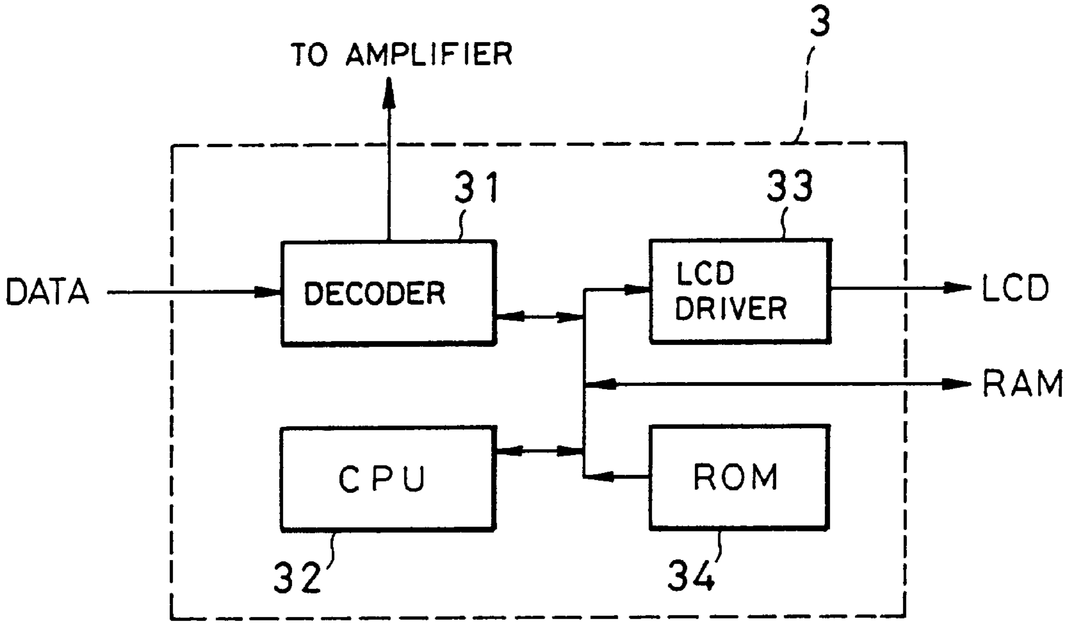
FIG. 4 is a block diagram showing a detail of a control circuit in the preferred embodiment of the radio selective call receiver of FIG. 1.

FIG. 4 is a block diagram showing a detail of the circuit construction of the controller 3 as discussed with reference to FIG. 1. In FIG. 4, the controller 3 of the preferred embodiment of the radio selective call receiver includes a decoder 31, a 8 bit microprocessor CPU 32, an LCD driver 33 and a read-only-memory (ROM) 34 as a program memory. These components are connected to each other through a 8 bit bus. The decoder 31 is responsive to match the selective call signal with the call number assingned to the receiver, to extract the message information from the vector information, and to send a notice to CPU 32.

CPU 32 reads outs the kind of the vector as a part of the vector information and the message information from the decoder 31 and transfers this information to the storage portion 4 for storing. The display data of the message is also transferred to the LCD driver 33 for displaying the message by the LCD 5. A program to perform the sequence of operation is written in ROM 34 serving as the program memory.

Figure 5:
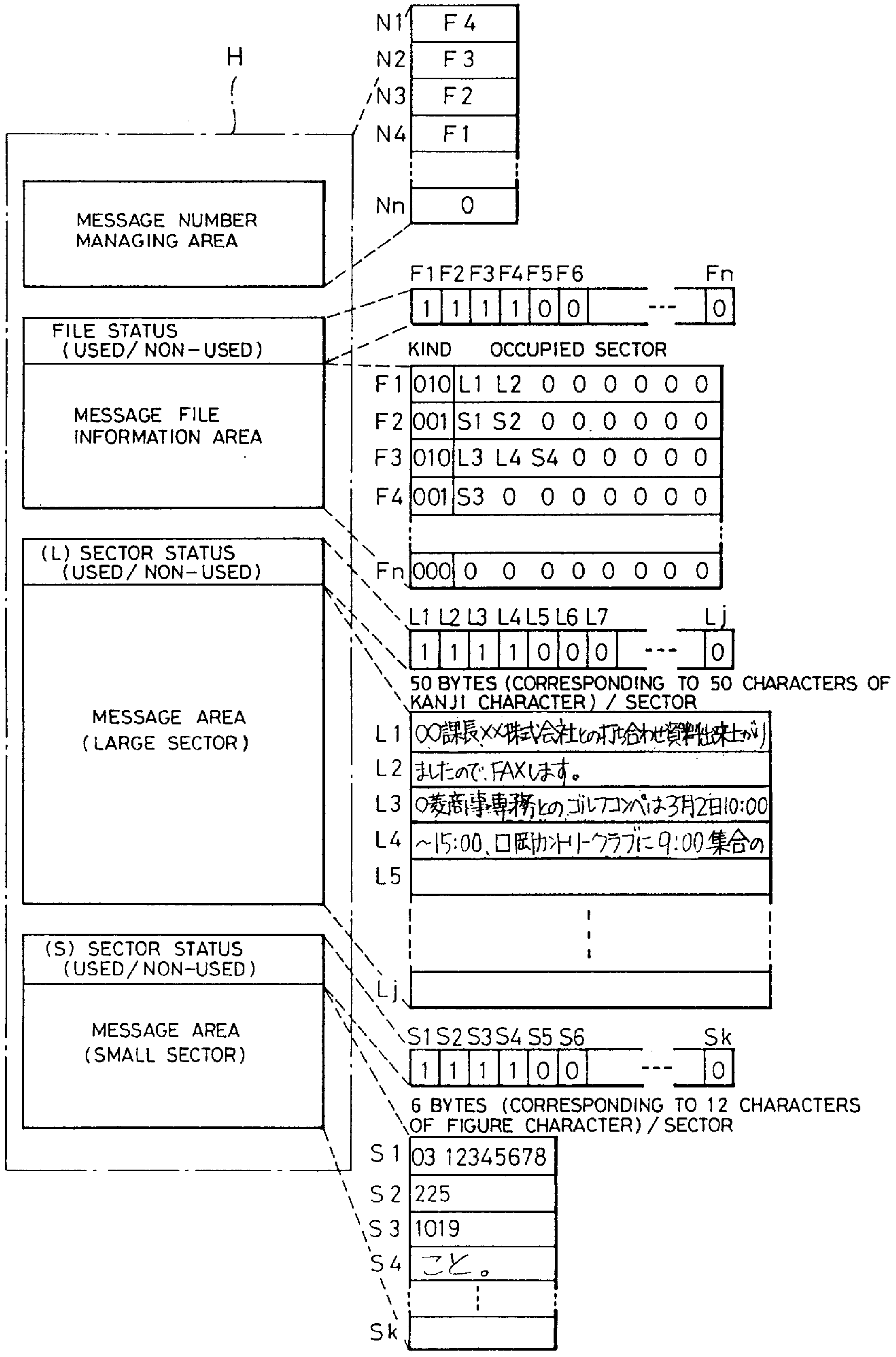
FIG. 5 is an explanatory illustration showing a structure of a memory area used for storing a message information in the present invention.

FIG. 5 shows an example of a data structure to be used in a method for storing the message to be implemented by the present invention. The message storage area H, discussed herein, consists of a message number managing area, a file status area, a message file information area, a message area and a message sector status. The message area is divided into a large sector size message area having sectors L of a large sector size and a small sector size message area having sectors S of a smaller sector size. These message areas are assigned a vacant and an occupied status by the message sector managing area.

N1 to Nn represent, in sequential order, the storage of message information in the time axis and the corresponding message number of the managing area storing message file number F1 to Fn. The initial values of all of N1 to Nn are "0" to indicate that no message file number is stored. Then, when the message signal is received and assuming that the message file is assigned to number F3, for example, number F3 information is set in the message number managing area N2.

The file status is a message file status judgment area storing the status of use of the message file, in which "0" representative of non-used (vacant) status and "1" representative of used (occupied) status is stored per each message file. Accordingly, when the message file is to be newly assigned, a vacant file is retrieved with reference to this register. Similarly, the message sector status is a sector status judgment area storing the status of use of the sector for storing the message information. Similar to the file status area, "1 (used)" or "0 (non-used)" is stored per each bit corresponding to each sector so that status, i.e. used or non-used status, can be indicated.

F1 to Fn represents a file message file information area assigned corresponding to the number of each message file. In this area, the sector numbers relating to a message file are stored per message file. In the shown example, the message file F1 consists of sectors L1 and L2 and represents that one free word message information is stored in these sectors.

S1 to Sk and L1 to Lk represent memory areas assigned corresponding to respective sector numbers. In these areas, the message information is stored. In the shown example, the storage capacity (number of bites) to be stored in the one sector L is 50 bites (corresponding to 25 characters of Kanji character), and the storage capacity (number of bytes) to be stored in the one sector S is 6 bites (corresponding to 12 characters of figure characters).

The message information is sequentially stored in the sector L and sector S depending upon message length. For example, the message file of number F1 consists of sectors L1 and L2 with the content "Dear Mr. Woo, material for discussion with XX company has been prepared. I will fax it."

Figure 6:
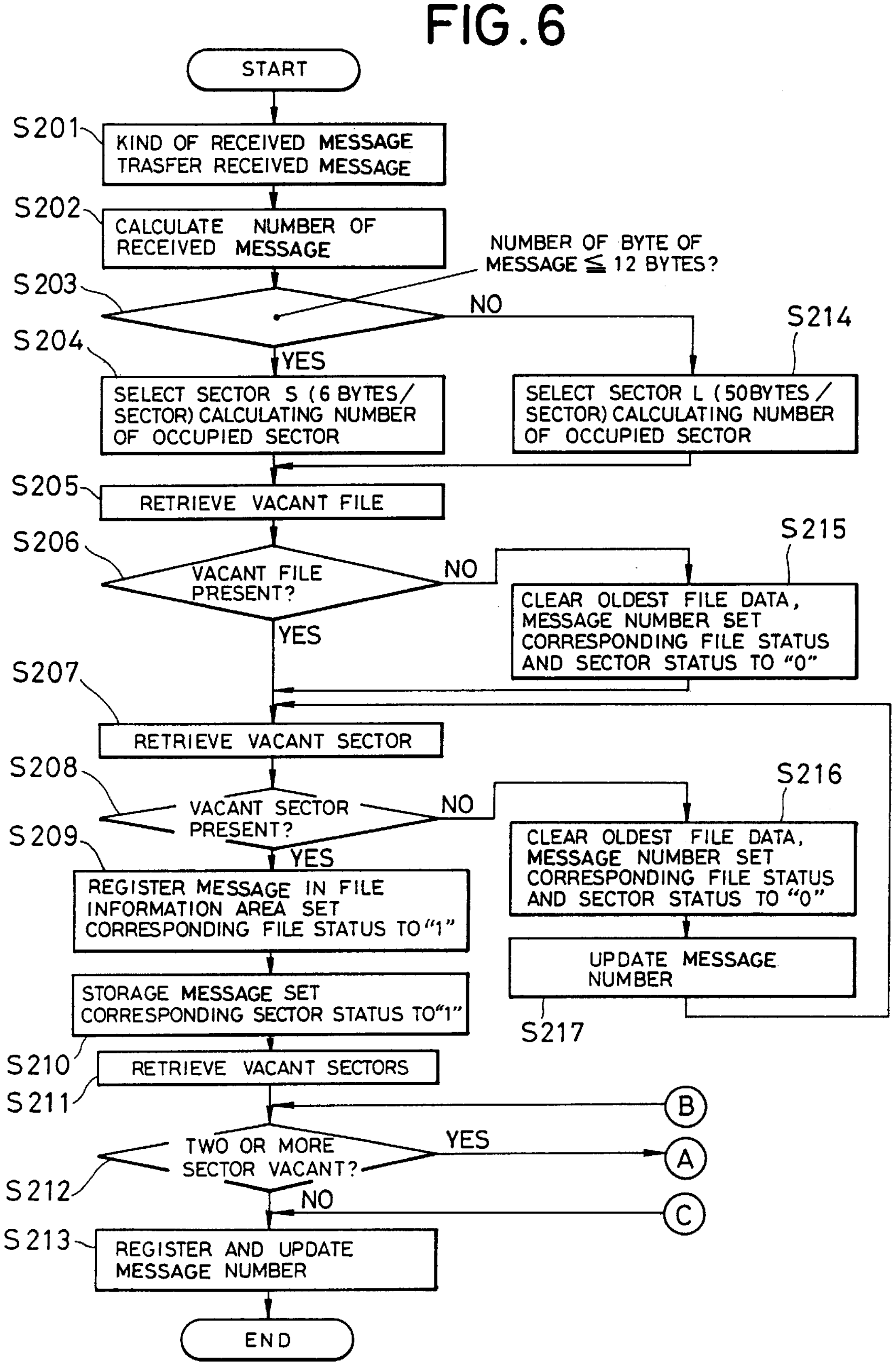
FIG. 6 is a flowchart showing steps S201 to S217 of a procedure for storing message in the present invention.
Figure 7:
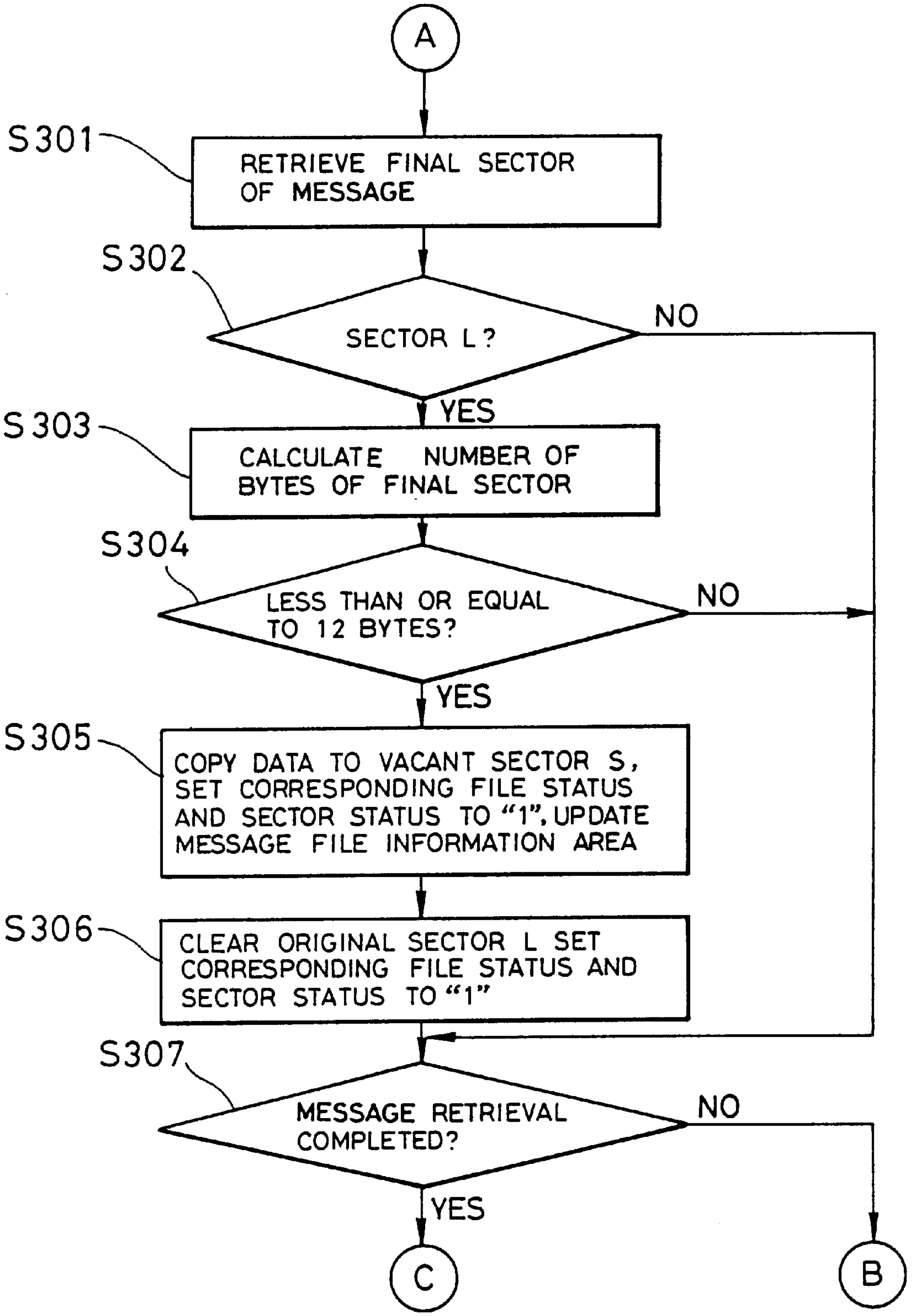
FIG. 7 is a flowchart showing steps S301 to S307 of a procedure for storing message in the present invention.

FIGS. 6 and 7 are flowcharts showing the process for storing the message in the preferred embodiment of the radio selective call receiver according to the present invention. At first, the controller 3 transfers the data indicative of the kind of the received message and the received message to a buffer area in the storage portion 4 (step S201) and calculates the number of bytes of the received message of the buffer area in the storage portion 4, to which the message is transferred (step S202).

Then, a judgment of the number of the bytes of the message is performed (step S203). When the number of bytes of the message is less than or equal to 12 bites, the process is advanced to a step S204, and when the number of bytes of the message is in excess of 12 bites, the process is advanced to a step S214. In step S204, the number of sectors to be occupied is calculated. S1milarly, in the step S214, the sector is selected and number of occupied sectors is calculated.

Next, by the file status, the vacant area of the message file information region to be used is retrieved (step S205) to check whether the vacant area is present or not (step S206). When the vacant area is present, the file region is obtained and then the process is advanced to step S207, otherwise, the process is advanced to step S215. Then, at step S215, the oldest message file and the content of the corresponding sector and the corresponding message number are cleared. In conjunction therewith, the corresponding file status and sector status are reset from "1" to "0 "

On the other hand, at step S207, the vacant area of the sector to be occupied is retrieved by respective sector status (step S208). If the vacant area is present, the sector region is obtained and then the process is advanced to step S209; otherwise, the process is advanced to step S216.

In the step S216, the oldest message file in the same sector size, the corresponding sector content, and the corresponding message number are cleared. Then, the file status and the sector status are reset from "1" to "0". On the other hand, when the vacant area is formed between the message numbers of the message number managing area by the process of the step S216, the storage is packed sequentially to remove the empty sector.

In step S209, the kind of the message obtained at the step S201 in the message file information and the sector number obtained at the step S207 are registered. Then, the corresponding file status is set to "1 ".

Next, according to the sector number registered at the step S209, the received message is stored. Then, the corresponding sector status is set to "1". Then, the vacant sector S is retrieved (step S211). When two or more vacant sectors are present, the process is advanced to step S301. If the vacant sector S is less than two, the process is advanced to step S213 to register and update the message number.

When two or more vacant sectors are present, the process is advanced to steps S301 to S307 to retrieve the sector L having stored characters of less than or equal to 12 bites to perform an optimization process which re-assign the stored message from sector L to the sector S. Therefore, at first, at the step S301, the final sectors of the stored messages are sequentially retrieved to check whether the sector is L or not (step S302). When the final sector is the sector L, the process is advanced to step S303 and when the final sector is the sector S, the process is advanced to step S307.

Then, in the step S303, the number of bytes of the final sector L is calculated. A check is performed whether the number of bytes of the final sector L is less than or equal to 12 bites (step S304). When the number of bytes of the final sector is less than 12 bites, the process is advanced to step S305, otherwise the process is advanced to step S307. In the step S305, re-assignment of the sector from the sector L to sector S is performed, and the corresponding sector status is set to "1".

Thereafter updating of the sector number to be occupied in the message file information area is performed. Subsequently, the original data is re-assigned and the sector status is cleared (step S306). Subsequently, a check is performed whether retrieval of the message is completed (step S307). Once the retrieval is completed, the process is advanced to the step S213. If the retrieval is not completed, the process is advanced to a step S212. Then, in the step S213, the file number obtained at step S215 is registered in the message number managing area to perform re-assignment of the message number.

As set forth above, according to the present invention, the radio selective call receiver is constructed with the radio signal receiving portion receiving the radio signal, the controller comparing the selective call signal in the received radio signal with the call number assigned to the receiver to take the received message corresponding the call number when the selective call signal matches with the call number, and the storage portion for storing the message received by the controller. The controller determines the sector length depending upon the message length of the received message and stores the received message in the storage portion depending upon the determined sector length. Therefore, the sector length of the memory area can be arbitrarily selected depending upon the received message to enhance use efficiency of the memory.

Also, according to the present invention, since a plurality of kinds of sector regions having sector lengths different from each other are provided in the storage portion, the sector length can be selected depending upon the length of the message. Thus, message storage efficiency can be significantly improved.

Also, according to the present invention, if the received message is to be stored in the sector having the longer sector length, when an end portion of the message to be stored in the final sector has a message length shorter than the sector length of the sector having the shorter sector length, the received message in the final sector is re-assigned to the sector having shorter sector length. Thus, use efficiency of the message storage region for the sectors having longer sector length can be improved.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A receiver comprising:

a signal receiver which receives a transmitted signal;

a memory which stores a received message received in the signal, the memory including at least a first and second message area each having different sector sizes; and a controller which controls storing of the received message in the memory;

the controller determines a sector length depending upon a length of the received message, assigns an assigned message area in response to the length of the received message, and stores the received message in the assigned message area of the memory depending upon the sector length.

2. A receiver as set forth in claim 1, wherein the controller compares a selective call signal in the signal received by the signal receiver with a call number assigned to the signal receiver and processes the received message when the selective call signal matches the call number.

3. A receiver as set forth in claim 2, wherein the controller further detects whether a vacant sector is present in the memory and erases an oldest stored message when a vacant sector is not present, thereby producing an erased sector.

4. A receiver as set forth in claim 3, wherein:

a sector status flag is provided for each sector to indicate whether the corresponding sector is occupied, and the controller detects the vacant sector by the sector status flag.

5. A receiver as set forth in claim 3, wherein the controller further determines whether the received message can be stored in the erased sector, and stores the received message in the erased sector when the controller determines that the received message can be stored in the erased sector.

6. A receiver as set forth in claim 5, wherein:

the first message area has sectors which are sized smaller than sectors of the second message area; and the controller performs a re-assignment when the received message is to be stored in the second message area and when a fraction of the message to be stored in a final sector in the second message area has a message length shorter than a sector length of a sector in the first message area, the re-assignment causing a transfer of the fraction of the message from the sector in the second message area to the sector in the first message area.

7. The receiver as claimed in claim 1, wherein the receiver is a radio selective call receiver and the signal is a radio signal.

8. The receiver as claimed in claim 1, wherein:

the first message area has sectors which are sized smaller than sectors of the second message area; and the controller performs a re-assignment when the received message is to be stored in the second message area and when a fraction of the message to be stored in a final sector in the second message area has a message length shorter than a sector length of a sector in the first message area, the re-assignment causing a transfer of the fraction of the message from the sector in the second message area to the sector in the first message area.

9. A method for storing a received message in a receiver having a memory with at least a first and second message area having different sector sizes, the method comprising:

receiving an input signal;

determining a sector length dependent upon a message length of a received message contained in the input signal thereby producing a determined sector length; and storing the received message in one of the message areas based upon the determined sector length.

10. A method for storing a received message as set forth in claim 9, further comprising:

comparing a selective call signal in the input signal with a call number assigned to the receiver;

processing the received message corresponding to the input selective call signal, when the selective call signal and the call number match.

11. A method for storing a received message as set forth in claim 10, further comprising:

determining whether a vacant sector is present in the memory; and erasing an oldest stored message, thereby creating an erased sector, when it is determined that a vacant sector is not present in the memory.

12. A method for storing a received message as set forth in claim 11, further comprising:

determining whether the received message can be stored in the erased sector; and storing the received message in the erased sector when it is determined that the received message can be stored therein.

13. A method for storing a received message as set forth in claim 12, wherein the first message area has a sector size which is smaller than a sector size of the second message area, said method further comprising:

reassigning the received message when the received message is to be stored in the second message area and when a fraction of the message to be stored in a final sector of the second message area has a message length shorter than a sector length of the sectors in the first message area, the reassigning causing a transfer of the fraction of the received message from the second message area to the first message area.

14. The method as claimed in claim 9, wherein the receiver is a radio selective call receiver and the signal is a radio signal.

15. The method for storing a received message as claimed in claim 9, wherein the first message area has a sector size which is smaller than a sector size of the second message area, said method further comprising:

reassigning the received message when the received message is to be stored in the second message area and when a fraction of the message to be stored in a final sector of the second message area has a message length shorter than a sector length of the sectors in the first message area, the reassigning causing a transfer of the fraction of the received message from the second message area to the first message area.

16. A receiver comprising:

a signal receiver which receives a transmitted signal;

a memory which stores a received message received in the signal; and a controller which controls storing of the received message in the memory;

the controller determines a sector length depending upon a length of the received message, assigns an assigned message area in response to the length of the received message, and stores the received message in the assigned message area of the memory depending upon the sector length;

the controller compares a selective call signal in the signal received by the signal receiver with a call number assigned to the receiver and processes the received message when the selective call signal matches the call number;

the controller detects whether a vacant sector is present in the memory and erases an oldest stored message when a vacant sector is not present, thereby producing an erased sector; and the controller determines whether the received message can be stored in the erased sector, and stores the received message in the erased sector when the controller determines that the received message can be stored in the erased sector; wherein the first message area has sectors which are sized smaller than sectors of the second message area; and the controller performs a re-assignment when the received message is to be stored in the second message area and when a fraction of the message to be stored in a final sector in the second message area has a message length shorter than a sector length of a sector in the first message area, the re-assignment causing a transfer of the fraction of the message from the sector in the second message area to the sector in the first message area.

17. A method for storing a received message in a receiver having a memory with at least a first and second message area having different sector sizes, wherein the first message area has a sector size which is smaller than a sector size of the second message area, said method comprising:

receiving a received signal;

determining a determined sector length dependent upon a message length of a received message contained in the received signal;

storing the received message in one of the message areas based upon the determined sector length;

comparing a selective call signal in the received signal with a call number assigned to the receiver;

processing the received message corresponding to the received selective call signal, when the selective call signal and the call number match;

determining whether a vacant sector is present in the memory;

erasing an oldest stored message, thereby creating an erased sector, when it is determined that a vacant sector is not present in the memory;

determining whether the received message can be stored in the erased sector;

storing the received message in the erased sector when it is determined that the received message can be stored therein; and reassigning the received message when the received message is to be stored in the second message area and when a fraction of the message to be stored in a final sector of the second message area has a message length shorter than a sector length of the sectors in the first message area, the reassigning causing a transfer of the fraction of the received message from the second message area to the first message area.

* * * * *